United States Patent
Dissauer et al.

(10) Patent No.: US 12,291,594 B2
(45) Date of Patent: May 6, 2025

(54) PROCESS FOR PREPARING POLYPROPYLENE WITH IMPROVED RECOVERY

(71) Applicant: Borealis AG, Vienna (AT)

(72) Inventors: Christoph Dissauer, Burghausen (DE); Stefan Bruckbauer, Burghausen (DE)

(73) Assignee: BOREALIS AG, Vienna (AT)

( * ) Notice: Subject to any disclaimer, the term of this patent is extended or adjusted under 35 U.S.C. 154(b) by 762 days.

(21) Appl. No.: 17/619,834

(22) PCT Filed: Jun. 10, 2020

(86) PCT No.: PCT/EP2020/066096
§ 371 (c)(1),
(2) Date: Dec. 16, 2021

(87) PCT Pub. No.: WO2020/260021
PCT Pub. Date: Dec. 30, 2020

(65) Prior Publication Data
US 2022/0306774 A1    Sep. 29, 2022

(30) Foreign Application Priority Data
Jun. 24, 2019  (EP) .................... 19182085

(51) Int. Cl.
*B01J 19/18*   (2006.01)
*C08F 2/00*    (2006.01)
*C08F 2/01*    (2006.01)
*C08F 6/00*    (2006.01)

(52) U.S. Cl.
CPC .............. *C08F 6/003* (2013.01); *C08F 2/001* (2013.01); *C08F 2/01* (2013.01); *C08F 6/005* (2013.01)

(58) Field of Classification Search
CPC ............ C08F 6/003; C08F 2/001; C08F 2/01
See application file for complete search history.

(56) References Cited

U.S. PATENT DOCUMENTS

| | | | |
|---|---|---|---|
| 9,273,169 B2 * | 3/2016 | Van Der Schrick | C08F 6/001 |
| 11,149,096 B2 * | 10/2021 | Al-Haj Ali | C08F 2/06 |
| 11,512,157 B2 * | 11/2022 | Al-Haj Ali | C08F 6/04 |
| 11,820,841 B2 * | 11/2023 | Haynie | C08F 210/14 |
| 11,851,518 B2 * | 12/2023 | Blood | C07C 7/09 |
| 2022/0234021 A1 * | 7/2022 | Krallis | B01J 8/1854 |
| 2024/0010765 A1 * | 1/2024 | Bergstra | B01J 19/2435 |

FOREIGN PATENT DOCUMENTS

| | | |
|---|---|---|
| EP | 2341087 A1 | 7/2011 |
| EP | 2602269 A1 | 6/2013 |
| WO | 2017108963 A1 | 6/2017 |

* cited by examiner

*Primary Examiner* — Katarzyna I Kolb
(74) *Attorney, Agent, or Firm* — Lippes Mathias LLP

(57) ABSTRACT

Described herein is a process for producing a propylene copolymer in at least a pre-polymerization stage, a first and a second reaction stage connected in series with improved monomer recovery, wherein a product stream, comprising a propylene polymer mixture, unreacted propylene, unreacted ethylene and hydrogen, if present, is separated in a separation unit into a first overhead stream and a first bottom product stream, wherein the desired propylene polymer mixture is recovered from the first bottom product stream. The first overhead stream is at least partially condensed, passed to a distillation column and separated into a second overhead stream and a second bottom product stream. The second overhead stream is at least partially condensed and split into three distinct streams, wherein a distillation reflux stream is returned into the distillation column, a first recycle stream is passed to the second reaction stage and a second recycle stream is passed to a stripping column from where a third bottom product stream is withdrawn and at least a part of it is passed to a propylene feed vessel, to the pre-polymerisation stage, to the first reaction stage, or to a combination thereof. Further disclosed is a polymerization unit, particularly suitable for carrying out the inventive process.

20 Claims, 2 Drawing Sheets

PROCESS FOR PREPARING POLYPROPYLENE WITH IMPROVED RECOVERY

CROSS REFERENCE TO RELATED APPLICATIONS

Figure 1:
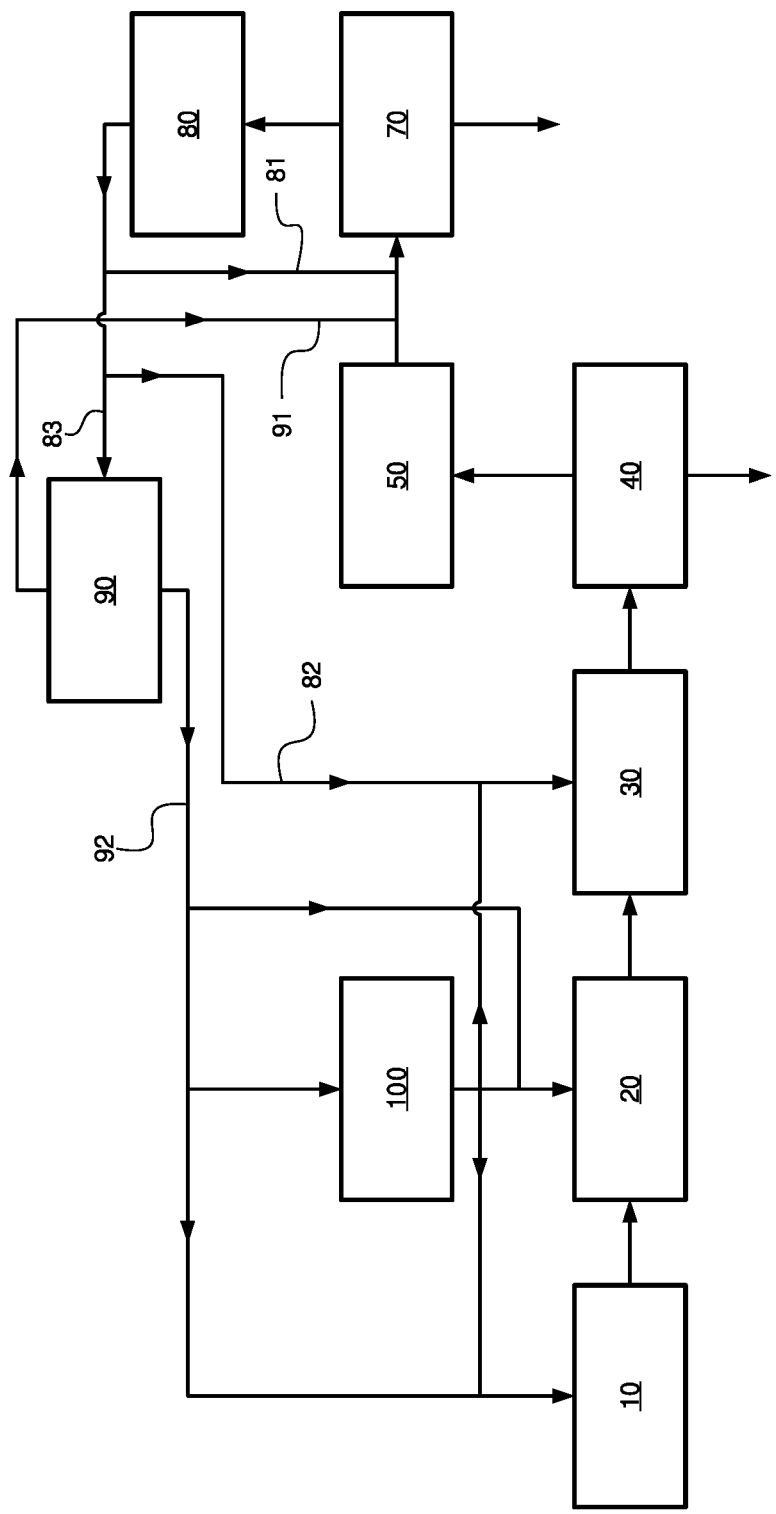

This is a 371 of PCT Application No. PCT/EP2020/066096, filed Jun. 10, 2020, which claims the benefit of European Application No. 19182085.1, filed Jun. 24, 2019, the contents of which are incorporated herein in their entirety.

The present invention relates to a process for propylene polymerization. In particular, the present invention is concerned with a process for producing propylene copolymers in a multistage process with improved recovery of unreacted propylene monomer and stable in operation at minimum operational costs. Further, the present invention also relates to a polymerization plant for producing propylene copolymers.

BACKGROUND

It is known, for instance from EP 0 887 380 and WO 2004/111095, to polymerize propylene in a multistage process in order to tailor the properties of the final polypropylene.

In EP 2 796 472, propylene is polymerized in two reaction stages, specifically in a loop reactor followed by a gas phase reactor connected in series, to produce polypropylene, which is particularly suitable for making pipes. On the other hand, EP 2 853 562 describes the polymerization of propylene in a similar loop reactor-gas phase reactor configuration, wherein the produced polypropylene is particularly suitable for making films. Further, EP 2 796 473 relates to a process for producing propylene copolymers having a broad molecular weight distribution in at least three reaction stages, wherein, for instance, a first polymerization stage is conducted in a loop reactor while the second and third polymerization stages are conducted in gas phase reactors connected in series.

In such polymerization processes, it is common that the applied monomer propylene is not completely consumed during the polymerization such that unreacted monomer needs to be removed from the final product. For process economical reasons, the unreacted propylene is not sent for disposal but it is at least partially recovered and recycled to the reaction stages of the process for further polymerization. For example, EP 0 887 380 discloses that the reaction product leaving the gas phase reactor of a loop reactor-gas phase reactor configuration is transferred to a solid/gas separation unit, where the solid polypropylene polymer is recovered as the bottom product while the gaseous overhead comprising unreacted propylene is recycled to the gas phase reactor and/or to the loop reactor via a monomer recovery system. In this monomer recovery system, which may include a membrane unit or stripping columns, the propylene monomer to be recycled is freed from hydrogen and/or light inert hydrocarbons.

In case of the production of propylene copolymers, the unreacted propylene is usually mixed with unreacted comonomers. For instance, when producing propylene-ethylene copolymers, such as propylene-ethylene random copolymers, the recycling stream usually contains unreacted propylene monomer together with unreacted ethylene comonomer. Thereby, ethylene may accumulate in a propylene feed vessel of a reaction stage, where the unreacted propylene is recycled to. However, too high ethylene concentrations in the propylene feed coming from said propylene feed vessel may cause operational troubles, particularly when the propylene feed is introduced into a slurry reactor or a preceding pre-polymerizer, either due to too high reactivity at the spot where the supplied fresh catalyst gets into contact with the propylene feed first or in the pre-polymerizer and its outlet lines because of the formation of sticky by-products, which may agglomerate.

Owing to this, when producing propylene-ethylene copolymers having a high content of ethylene, such as propylene-ethylene random copolymers, either the recycling of unreacted propylene monomer being inevitably mixed with ethylene comonomer needs to be limited or most of the entrained ethylene comonomer must be removed from the recycling stream, which is then passed to a propylene feed vessel or directly to the pre-polymerization stage as a feed. However, when the recycling of unreacted propylene monomers is limited, at least a part of the unreacted propylene monomer is sent for disposal, which deteriorates the recovery efficiency of the polymerization process. On the other hand, the removal of unreacted ethylene comonomer requires additional process steps. For instance, the concentration of unreacted ethylene comonomer in a recycling stream may be reduced by distillation. However, permanently operating an ethylene distillation column in a recovery system consumes a lot of energy and is, thus, very cost intense. Likewise, the ethylene removal may be conducted in a stripping column, where light components, such as hydrogen and ethylene, are at least partially removed from the propylene recycling stream. Again, stripping unreacted ethylene from a large volume of unreacted propylene is an energy-intensive process and may, thus, be uneconomical. As another alternative, the recycling stream may be thermally processed, which also considerably increases the energy consumption and the operational costs. In industrial polymerization processes, however, it is a general aim to minimize the necessary installation and operational costs.

Hence, there is still a need for a process for producing propylene copolymers, particularly copolymers of propylene and ethylene, such as propylene-ethylene random copolymers, in a multistage process exhibiting an improved recovery efficiency of unreacted propylene monomer at reduced operational costs and without affecting the stability of the production process.

SUMMARY OF THE INVENTION

The present invention is based on the finding that the efficiency of the recovery of unreacted propylene monomer in a process for producing propylene copolymers comprising at least three reaction stages can be improved at minimum operational costs and without affecting the stability of the process by splitting a specific stream from a recovery system of the process into three distinct streams. Specifically, in the prior art, an overhead stream from a distillation column of the recovery system comprising unreacted propylene, unreacted ethylene and optionally hydrogen is usually condensed and passed to a stripping column, where light components, such as hydrogen and ethylene, are at least partially removed. The remainder comprising unreacted propylene is then recycled to a propylene feed vessel or to a reaction stage. In the present, invention, however, said condensed overhead stream from the distillation column of the recovery system is split into three distinct streams, wherein one stream is still passed to a stripping column while one stream is passed to the last reaction stage and one stream is recycled back into the distillation column. Moreover, it has been found that another propylene feed vessel for the last reaction stage is no longer necessary due to the recycling of one split stream. Consequently, the operational costs of the process and the installation costs of a respective polymerization unit can even be reduced.

Therefore, in one aspect, the present invention relates to a process for producing a propylene copolymer in at least three reaction stages connected in series, comprising the steps of:
a) pre-polymerizing a polymerization catalyst by introducing propylene, optionally ethylene, optionally hydrogen, the polymerization catalyst and optionally cocatalyst into a pre-polymerization stage to produce a pre-polymerized polymerization catalyst;
b) withdrawing the pre-polymerized polymerization catalyst from the pre-polymerization stage and passing it to a first reaction stage;
c) polymerizing propylene by introducing propylene, ethylene, and optionally hydrogen into the first reaction stage to produce a first reaction mixture comprising a first propylene copolymer, unreacted propylene, unreacted ethylene and hydrogen, if present;
d) withdrawing a first product stream comprising the first reaction mixture from the first reaction stage and passing at least a part of it to a second reaction stage;
e) continuing the polymerization in the second reaction stage in the presence of the first propylene copolymer, optionally introducing additional propylene, additional ethylene and/or additional hydrogen into the second reaction stage, to produce a second reaction mixture comprising a propylene polymer mixture of the first propylene copolymer and a second propylene copolymer, unreacted propylene, unreacted ethylene, and hydrogen, if present;
f) withdrawing a second product stream comprising the second reaction mixture from the second reaction stage and passing at least a part of it to a separation unit and separating the second product stream into a first overhead stream and a first bottom product stream, the first overhead stream comprising unreacted propylene, unreacted ethylene, oligomers as well as hydrogen and cocatalyst, if present, and the first bottom product comprising solid particles of the propylene polymer mixture;
g) recovering the propylene polymer mixture from the first bottom product stream;
h) condensing at least a part of the first overhead stream;
i) passing at least a part of the first overhead stream to a distillation column and separating the at least a part of the first overhead stream into a second overhead stream and a second bottom product stream, the second overhead stream comprising unreacted propylene, unreacted ethylene and hydrogen, if present;
j) withdrawing the second overhead stream and the second bottom product stream from the distillation column; and
k) condensing at least a part of the second overhead stream, thereby producing a condensed second overhead stream and, optionally, a vapour-phase second overhead stream;
wherein the process further comprises the steps of
l) splitting the condensed second overhead stream into a distillation reflux stream, a first recycle stream and a second recycle stream, and returning the distillation reflux stream into the top of the distillation column, passing the first recycle stream to the second reaction stage and passing the second recycle stream to a stripping column; and
m) withdrawing a third overhead stream comprising unreacted ethylene and hydrogen, if present, and a third bottom product stream comprising unreacted propylene from the stripping column, and passing the third overhead stream to the distillation column and passing at least a part of the third bottom stream to a propylene feed vessel, to the pre-polymerisation stage, to the first reaction stage, or to a combination thereof.

In another aspect, the present invention refers to a polymerization unit for producing a propylene copolymer comprising a propylene feed vessel and a pre-polymerization stage, a first reaction stage and a second reaction stage connected in series, and a recovery system, the recovery system comprising;
i) a separation unit connected to the second reaction stage;
ii) a first condenser connected to (the top of) the separation unit;
iii) a distillation column connected to (the bottom of) the first condenser;
iv) a second condenser connected to (the top of) the distillation column; and
v) a stripping column;
wherein the recovery system further comprises
vi) a distillation reflux line connecting (the bottom of) the second condenser with (the top of) the distillation column;
vii) a first recycle line connecting (the bottom of) the second condenser with the second reaction stage;
viii) a second recycle line connecting (the bottom of) the second condenser with the stripping column;
ix) a third recycle line connecting (the top of) the stripping column with the distillation column; and
x) a fourth recycle line connecting (the bottom of) the stripping column with the propylene feed vessel, the pre-polymerization stage and/or with the first reaction stage.

FIGURES

FIG. 1: Schematic representation of a polymerization unit according to the present invention.

Figure 2:
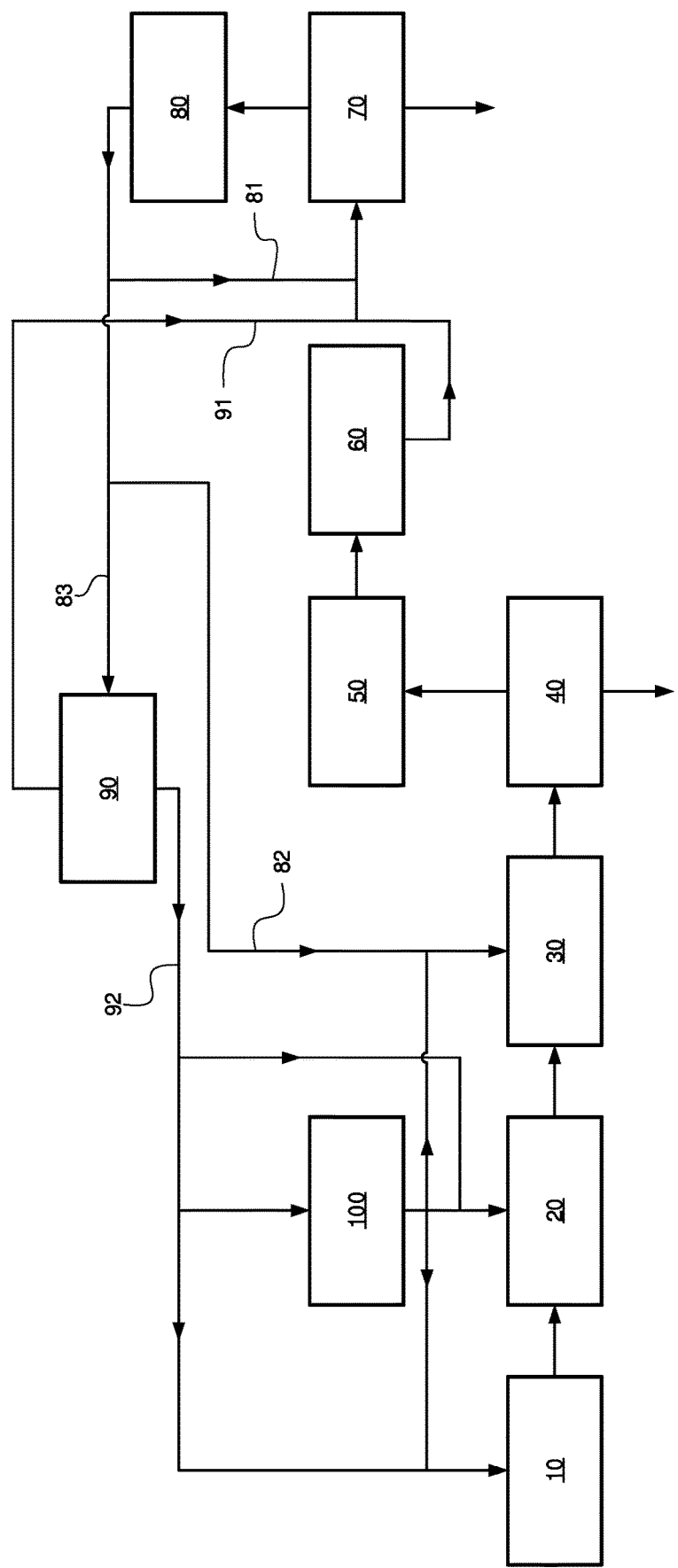

FIG. 2: Schematic representation of a preferred embodiment of a polymerization unit according to the present invention.

DEFINITIONS

A 'polymerization unit' according to the present invention is a unit in which an olefin polymer, here a propylene copolymer, may be produced by polymerization. The unit comprises at least a pre-polymerization stage, a first reaction stage and a second reaction stage.

The terms 'pre-polymerization stage' and 'reaction stage' stand for one or more polymerization reactors of the same type connected in series including means for operating and interconnecting the respective polymerization reactor(s) such as feed vessels, inlet and outlet lines and the like.

Preferably, the first reaction stage comprises at least one slurry reactor and the second reaction stage comprises at least one gas phase reactor. The pre-polymerization stage preferably comprises a slurry reactor.

A 'slurry reactor' designates any reactor operating in bulk or slurry and in which the polymer forms in particulate form. A 'slurry' is a heterogeneous mixture of solid particles dispersed in a liquid phase. The solid particles are usually solid olefin polymer particles, here polypropylene particles, obtained by a polymerization process. The fluid phase usually comprises liquid olefin monomer, here propylene, and optionally unreacted comonomer, here ethylene.

Preferably, the slurry reactor is a 'loop reactor', which refers to a closed pipe typically completely filled with slurry in which the slurry is circulated with a high velocity along the pipe by using a circulation pump. Loop reactors are well known in the art and examples are given, for instance, in U.S. Pat. Nos. 4,582,816, 3,405,109, 3,324,093, EP-A-479186 and U.S. Pat. No. 5,391,654. A loop reactor usually comprises vertical segments and horizontal segments, both interconnected by bends or elbows, respectively. Depending on whether a horizontal segment is interconnected via a bend or elbow to an upper end or to a lower end of a vertical segment, the horizontal segment either represents a lower or an upper horizontal segment.

A 'gas phase reactor' designates any mechanically mixed or fluidized bed reactor in which the polymerization is conducted using gaseous olefin monomers, here propylene, in which the polymer particles are growing.

A 'recovery system' stands for the entirety of all technical means suitable for recovering unreacted monomer, here propylene, from the polymerization process, such as gas/solid separation units, distillation columns, stripping columns, vent condensers or membrane units.

The term 'recovery efficiency' refers to relation between the amount of unreacted propylene monomer, which is actually re-introduced into the polymerization process and finally consumed by polymerization, to the overall amount of unreacted propylene monomer. Hence, the higher the amount of unreacted propylene monomer recycled into the polymerization process relative to the overall amount of unreacted propylene monomer, the better the recovery efficiency.

DETAILED DESCRIPTION

Process

In one aspect, the present invention relates to a process for producing a propylene copolymer in at least three reaction stages connected in series with improved recovery efficiency.

Pre-Polymerization Stage

In a first step of the inventive process (step a)), a polymerization catalyst is pre-polymerized by introducing propylene, optionally ethylene, optionally hydrogen, the polymerization catalyst and optionally a cocatalyst into a pre-polymerization stage.

The polymerization catalyst introduced into the pre-polymerization stage may be any catalyst, which is capable of producing the desired propylene polymer. Suitable catalysts are, among others, Ziegler-Natta catalysts based on a transition metal, such as titanium, zirconium and/or vanadium catalysts. Especially Ziegler-Natta catalysts are useful as they can produce propylene polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 2 to 100 μm. However, it has turned out that special advantages can be obtained if the support has median particle size from 6 to 90 μm, preferably from 6 to 70 μm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above-mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with a cocatalyst. Suitable cocatalysts are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore, they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred cocatalysts are trialkylaluminiums, of which triethylaluminium, trimethylaluminium and tri-isobutylaluminium are particularly used.

If needed, the cocatalyst may also include an external electron donor. Suitable electron donor compounds are disclosed in WO-A-95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882. Also electron donors consisting of organosilane compounds, containing Si—OCOR, Si—OR, and/or Si—NR$_2$ bonds, having silicon as the central atom, and R is an alkyl, alkenyl, aryl, arylalkyl or cycloalkyl with 1-20 carbon atoms are known in the art. Such compounds are described in U.S. Pat. Nos. 4,472,524, 4,522,930, 4,560,671, 4,581,342, 4,657,882, EP-A-45976, EP-A-45977 and EP-A-1538167.

The amount in which the cocatalyst is used depends on the specific catalyst and cocatalyst. Typically triethylaluminium is used in such amount that the molar ratio of aluminium to the transition metal, like Al/Ti, is from 1 to 1000, preferably from 3 to 100 and in particular from about 5 to about 30 mol/mol.

Also metallocene catalysts may be used. Metallocene catalysts comprise a transition metal compound, which contains a cyclopentadienyl, indenyl or fluorenyl ligand. Preferably the catalyst contains two cyclopentadienyl, indenyl or fluorenyl ligands, which may be bridged by a group preferably containing silicon and/or carbon atom(s). Further, the ligands may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

The metallocene catalyst is used together with a cocatalyst. Suitable cocatalysts are metal alkyl compounds and especially aluminium alkyl compounds known in the art. Especially suitable cocatalysts used with metallocene catalysts are alkylaluminium oxy-compounds, such as methylalumoxane (MAO), tetraisobutylalumoxane (TIBAO) or hexaisobutylalumoxane (HIBAO).

The purpose of the pre-polymerisation is to polymerize a small amount of propylene (co)polymer onto the catalyst at a low temperature and/or a low propylene monomer concentration to produce a pre-polymerized polymerization catalyst. By pre-polymerization, it is possible to improve the performance of the catalyst in slurry and/or modify the properties of the final propylene polymer. The pre-polymerization step is preferably conducted in a slurry reactor. More preferably, the pre-polymerization is conducted in a loop reactor.

The pre-polymerization is then preferably conducted in liquid monomer where the monomer concentration is at least 50 wt. %, typically at least 60 wt. %. The monomer concentration in the loop reactor may, thus, range from 50 to 90 wt. %, preferably from 60 to 90 wt. %, and more preferably from 70 to 90 wt. %.

Further, the pre-polymerization is preferably conducted continuously.

The temperature in the pre-polymerization step is typically from 0 to 90° C., preferably from 0 to 40° C. and more preferably from 0 to 30° C.

The pressure is not critical and is typically from 1 to 150 bar, preferably from 10 to 100 bar.

Typically, from about 0.1 to 1000 grams of propylene monomer per one gram of solid catalyst component is polymerised onto the solid catalyst component in the pre-polymerization step. As the person skilled in the art knows, the catalyst particles recovered from a continuous pre-polymerization reactor do not all contain the same amount of pre-polymer. Instead, each particle has its own characteristic amount, which depends on the residence time of that particle in the pre-polymerization reactor. As some particles remain in the reactor for a relatively long time and some for a relatively short time, also the amount of pre-polymer on different particles is different and some individual particles may contain an amount of pre-polymer, which is outside the above limits. However, the average amount of pre-polymer on the catalyst typically is within the limits specified above.

The molecular weight of the pre-polymer may be controlled by hydrogen as it is known in the art. Further, antistatic additive may be used to prevent the particles from adhering to each other or the walls of the reactor, as disclosed in WO-A-96/19503 and WO-A-96/32420.

The polymerization catalyst components are preferably all introduced to the pre-polymerization step. However, where the solid catalyst component and the cocatalyst can be fed separately, it is possible that only a part of the cocatalyst is introduced into the pre-polymerization stage and the remaining part is supplied to subsequent polymerization stages. Also in such cases, it is necessary to introduce so much cocatalyst into the pre-polymerization stage that a sufficient polymerization reaction is obtained therein.

In the subsequent step b), the pre-polymerized polymerization catalyst is withdrawn from the pre-polymerization stage and passed to a first reaction stage connected in series.

First Reaction Stage

In step c) of the inventive process, propylene is polymerized by introducing propylene, ethylene, and optionally hydrogen into the first reaction stage.

Hydrogen may be introduced into the first reaction stage to control the molecular weight of the first propylene copolymer.

As the propylene monomer and the ethylene comonomer are usually not consumed completely during the polymerization, a first reaction mixture comprising the first propylene copolymer, unreacted propylene, unreacted ethylene and hydrogen, if present, is produced in the first reaction stage.

Preferably, the first reaction stage comprises at least one slurry reactor, more preferably at least one loop reactor. Accordingly, the first reaction stage may comprise two or more slurry reactors, preferably loop reactors, connected in series.

Moreover, in case the first reaction stage comprises at least one slurry reactor, or preferably at least one loop reactor, the polymerisation of propylene is usually conducted as a particle form process in liquid monomer. In such a process, the polymerisation catalyst is passed to the at least one slurry reactor, preferably to the at least one loop reactor, in particle form via a prepolymerisation step as described above. The propylene polymer then grows on the catalyst particles thereby forming a slurry comprising solid propylene polymer particles in liquid monomer.

The monomer concentration in the liquid phase is at least 50 wt. %, typically at least 60 wt. %. Hence, the monomer concentration in the loop reactor may range from 50 to 90 wt. %, preferably from 60 to 90 wt. %, and more preferably from 70 to 90 wt. %.

The temperature in the at least one slurry reactor, preferably in the at least one loop reactor, is typically from 60 to 100° C., preferably from 70 to 90° C. An excessively high temperature should be avoided to prevent partial dissolution of the polypropylene into the diluent and the fouling of the reactor. The pressure is from 1 to 150 bar, preferably from 40 to 80 bar.

Hydrogen is preferably introduced into the at least one slurry reactor, preferably into the at least one loop reactor, for controlling the melt flow rate (MFR) of the propylene polymer. The amount of hydrogen needed to reach a desired MFR depends on the catalyst used and the polymerisation conditions.

The average residence time in the at least one slurry reactor, preferably in the at least one loop reactor, is typically from 20 to 120 minutes, preferably from 30 to 80 minutes. As it is well known in the art the average residence time T can be calculated from:

$$\tau = \frac{V_R}{Q_o} \quad \text{(eq. 1)}$$

where $V_R$ is the volume of the reaction space (i.e. the volume of the reactor) and $Q_o$ is the volumetric flow rate of the product stream (including the polymer product and the fluid reaction mixture).

The production rate in the at least one slurry reactor, preferably in the at least one loop reactor, is suitably controlled with the catalyst feed rate.

In subsequent step d), a first product stream comprising the first reaction mixture is withdrawn from the first reaction stage and at least a part of it is passed to a second reaction stage.

Thereby, the withdrawn first product stream may either be passed directly or indirectly to the second reaction stage. When passed directly, the first product stream is led to the second reaction stage without any purification step. When passed indirectly, the first product stream is subjected to a purification step before being led to the second reaction stage. This purification step may include leading the first product stream into a gas/solid separation unit, such as a flash tank, where the solid first propylene copolymer is recovered as the bottom product and passed to the second reaction stage. The off-gas comprising the unreacted propylene and unreacted ethylene is fully or partially freed from hydrogen and/or light inert hydrocarbon impurities by using a membrane unit or a stripping column before being led to the second reaction stage in gaseous form. Alternatively, the off-gas may be condensed, and optionally hydrogen or other light components can be removed before the unreacted propylene monomer is fed into the second reaction zone as a liquid.

Second Reaction Stage

In step e) of the inventive process, the polymerization of propylene is continued in the second reaction stage in the presence of the first propylene copolymer to produce a second reaction mixture.

Optionally, fresh propylene monomer may be introduced into the second reaction zone. In this context, fresh propylene monomer designates non-recycled propylene monomer and does not refer to unreacted propylene monomer, which has been transferred from the first reaction stage via in the first product stream or which is recycled into the second reaction stage via the first recycle stream.

However, it is preferred that no fresh propylene monomer is introduced into the second reaction stage. Rather, it is preferred that the amount of unreacted propylene monomer coming from the first reaction stage via the first product stream and/or being recycled into the second reaction stage via the first recycle stream is sufficient for the polymerization of propylene in the second reaction stage.

Further, fresh ethylene may be introduced into the second reaction zone. Again, fresh ethylene denotes non-recycled ethylene and does not refer to unreacted ethylene, which has been transferred from the first reaction stage via in the first product stream or which is recycled into the second reaction stage via the first recycle stream.

Furthermore, fresh hydrogen may be introduced into the second reaction stage for controlling the molecular weight of the second propylene copolymer. Thereby, fresh hydrogen relates to non-recycled hydrogen and does not refer to hydrogen, which has been transferred from the first reaction stage via in the first product stream or which may be recycled into the second reaction stage via the first recycle stream.

Although the introduction of hydrogen into the first and second reaction stage is optional, respectively, it is preferred that hydrogen is introduced into at least one of said reaction stages.

The introduction of additional catalyst into the second reaction stage is not necessary as particles of the first propylene copolymer containing active polymerization catalyst dispersed therein, are passed from the first reaction stage into the second reaction stage.

In the second reaction stage, a second reaction mixture comprising a propylene polymer mixture of the first propylene copolymer and a second propylene copolymer is produced. The propylene polymer mixture may comprise from 10 to 90% by weight of the first propylene copolymer and from 90 to 10% by weight of the second propylene copolymer, preferably from 30 to 70% by weight of the first propylene copolymer and from 70 to 30% by weight of the second propylene copolymer, more preferably from 35 to 65% by weight of the first propylene copolymer and from 65 to 35% by weight of the second propylene copolymer, even more preferably from 35 to 50% by weight of the first propylene copolymer and from 65 to 50% by weight of the second propylene copolymer. As the propylene monomer and the ethylene comonomer are usually not consumed completely during the polymerization in the second reaction stage either, the second reaction mixture comprises unreacted propylene, unreacted ethylene and hydrogen, if present.

Preferably, the second reaction stage comprises at least one gas-phase reactor. Accordingly, the second reaction stage may comprise two or more gas-phase reactors connected in series.

The at least one gas-phase reactor may is suitably a fluidized bed reactor. Such reactors are well known in the art.

In a fluidized bed gas-phase reactor, olefins, here propylene and ethylene, are polymerized in the presence of a polymerization catalyst in an upwards moving gas stream. The reactor typically contains a fluidized bed comprising the growing polymer particles containing the active catalyst, said fluidized bed having its base above a fluidization grid and an upper level within the gas phase reactor.

The polymer bed is fluidized with the help of the fluidization gas comprising the olefin monomer (here propylene), optional comonomer(s), optional chain growth controllers or chain transfer agents, such as hydrogen, and optional inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components are typically continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP 600414 and EP-A-721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the transport velocity, as otherwise the whole bed would be entrained with the fluidization gas. The bed voidage then is then typically less than 0.8, preferably less than 0.75 and more preferably less than 0.7. Generally the bed voidage is at least 0.6. An overview is given, among others in Geldart: Gas Fluidization Technology, J. Wiley & Sons, 1986 in chapters 2.4 and 2.5 (pages 17-18) as well as in chapters 7.3 to 7.5 (pages 169-186, especially Figure 7.21 on page 183).

When the fluidization gas is contacted with the bed containing the active catalyst, the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants may be introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The top part of the gas-phase reactor may include a so called disengagement zone. In such a zone, the diameter of the reactor is increased to reduce the gas velocity and allow the particles that are carried from the bed with the fluidization gas to settle back to the bed.

The bed level, i.e., the upper level, may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

A fluidized bed gas-phase reactor is operated at a temperature within the range of from 65 to 100° C., preferably from 65 to 85° C. The pressure is suitably from 10 to 100 bar, preferably from 15 to 30 bar.

Recovery

In step f) of the inventive process, a second product stream comprising the second reaction mixture is withdrawn from the second reaction stage and at least a part of it is passed to a separation unit.

The second product stream may be withdrawn from the second reaction zone either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

In the separation unit, second product stream comprising the second reaction mixture is separated into a first overhead stream and a first bottom product stream. The first overhead stream comprises unreacted propylene, unreacted ethylene, oligomers as well as hydrogen and cocatalyst, if present respectively. The first bottom product stream comprises solid particles of the propylene polymer mixture, i.e. solid particles of the first propylene copolymer and the second propylene copolymer.

Preferably, the separation is conducted by reducing the pressure of the second product stream. Accordingly, the separation unit is preferably a tank where the polymer powder is withdrawn from the bottom and the gases from the top.

In step g) of the inventive process, the desired propylene polymer mixture is recovered from the first bottom product stream of the preceding separation step.

The recovery of the propylene polymer mixture may comprise purging steps, stripping steps, extraction steps and the like. Also combinations of different steps are possible. For instance, the propylene polymer mixture may be contacted with steam at a temperature of from 90 to 110° C. for a period of from 10 minutes to 3 hours. Thereafter, the powder may be purged with inert gas, such as nitrogen, over a period of from 1 to 60 minutes at a temperature of from 20 to 80° C. In alternative, the propylene polymer mixture may be purged with an inert gas, such as nitrogen, over a period of from 20 minutes to 5 hours at a temperature of from 50 to 90° C.

The purging steps are preferably conducted continuously in a settled moving bed. The polymer moves downwards as a plug flow and the purge gas, which is introduced to the bottom of the bed, flows upwards.

Suitable processes for removing hydrocarbons from polymer are disclosed in WO-A-02/088194, EP-A-683176, EP-A-372239, EP-A-47077 and GB-A-1272778.

After the recovery of the propylene polymer mixture, it is preferably mixed with additives as it is well known in the art. Such additives include antioxidants, process stabilizers, neutralizers, lubricating agents, nucleating agents, pigments and so on. Thereafter, it may be extruded to pellets as it is known in the art. Preferably co-rotating twin screw extruder is used for the extrusion step. Such extruders are manufactured, for instance, by Coperion (Werner & Pfleiderer) and Japan Steel Works.

In step h) of the inventive process, at least a part of the gaseous first overhead stream coming from the separating unit is condensed before being passed into a distillation column. In other words, it is preferred to introduce at least a part of the first overhead stream into the distillation column in liquid form. The condensing may be carried out by methods known in the art, for instance by cooling and/or compression.

After condensing at least a part of the first overhead stream, at least a part of it is passed to a distillation column in subsequent step i). Therein, the at least a part the condensed first overhead stream is separated into a second overhead stream and a second bottom product stream. The second overhead stream comprises unreacted propylene which shall be recovered and unreacted ethylene as well as hydrogen, if present. The second bottom product stream comprises oligomers and co-catalyst, which may be denoted as the 'heavies'. As the 'heavies' are removed from the first overhead stream, the distillation column may also be designated as a 'heavies column'. Alternatively, it may also be denoted as 'propylene distillation column'.

Typically, the distillation column has from 6 to 15 trays, such as 10 trays. The operating pressure is typically from 17 to 21 bar(g) and then the temperature at the top is typically from 48 to 50° C. (depending to some extent on the pressure) and the bottom temperature is from 50 to 55° C. As it is well known in the art, it is possible to analyse the composition of the stream fed to the distillation column (here the condensed first overhead stream), of the second overhead stream and of the second bottom product stream and to control the distillation column accordingly. Thereby, the cooling rate subjected to the second overhead stream and the heating rate provided via the reboiler may be adjusted to reach desired composition of the second overhead stream.

In the distillation column, heavy components are separated from unreacted propylene monomer. Accordingly, unreacted propylene together with other light components, such as unreacted ethylene and hydrogen, if present, is withdrawn as the second overhead stream from the top of the distillation column while heavy impurities, such as oligomers, cocatalyst and propane, together with some accompanying propylene, are withdrawn as the second bottom product stream from the bottom of the distillation column in step j) of the inventive process.

In process step k), the second overhead stream is at least partially condensed after it is withdrawn from the distillation column, thereby producing a condensed second overhead stream and, optionally, a vapour phase second overhead stream.

Typically, the condensation of the withdrawn second overhead stream is conducted by passing it in vapour phase to a heat exchanger and cooling it so that at least a part of the second overhead stream condenses. The at least partially condensed second overhead stream is then suitably passed to a vessel. From said vessel a liquid stream, i.e. the condensed second overhead stream, and, optionally, a vapour-phase second overhead stream are withdrawn. The vapour-phase second overhead stream may be passed to a refinery or to combustion.

In step l) of the inventive process, the liquid stream, i.e. the condensed second overhead stream, is split into three separate streams. One of said split streams, the distillation reflux stream, is returned into the distillation column, preferably into the top of the distillation column, as a reflux stream. Another split stream, the first recycle stream, is passed to the second reaction stage and yet another split stream, the second recycle stream, is passed to a stripping column for the removal of light impurities.

It has been found that the amount of unreacted propylene monomer recycled into the second reaction stage via the first recycle stream together with the amount of unreacted propylene monomer transferred from the first reaction stage may be sufficient for continuing the polymerization in the second reaction stage, i.e. for producing the second propylene copolymer. As a result, no fresh propylene needs to be introduced into the second reaction stage, such that no additional propylene feed vessel for the second reaction stage is required. Consequently, the operational costs of the process are reduced.

Accordingly, it is preferred in the inventive process that propylene is fed to the pre-polymerization stage and/or to the first reaction stage from a single propylene feed vessel. Should it become necessary to introduce additional propylene into the second reaction stage, it can also be fed from said single propylene feed vessel.

The second recycle stream is passed to a stripping column. The stripping column is a distillation column with about from 6 to 12, such as 8, trays. The stripping column is operated so that an overhead stream thereof, the third overhead stream, comprises most of the unreacted ethylene and hydrogen, if present, supplied with the second recycle stream, whereas a bottom product stream, the third bottom product stream, comprises unreacted propylene with a reduced content of ethylene and hydrogen.

In the last step m) of the inventive process, the third overhead stream is withdrawn from the stripping column and passed to the distillation column. Suitably, the third overhead stream is returned to the distillation column on or near the same tray where the first overhead stream enters the column. The mass flow rate of the third overhead stream is suitably controlled to obtain the desired content of unreacted propylene in the third bottom product stream Further, the third bottom product stream is also withdrawn from the stripping column and at least a part of it is suitably passed to a propylene feed vessel from where the propylene feed streams to the pre-polymerization stage and to the first reaction stage (and optionally to the second reaction stage) are withdrawn. In addition or in alternative, at least a part of the third bottom product stream may be passed directly to the pre-polymerization stage and/or to first reaction stage as a feed, respectively.

Preferably, in the inventive process, the ratio of the first recycle stream to the distillation reflux stream (mass/mass) is 1:5 to 2:1. Likewise, the ratio of the first recycle stream to the second recycle stream (mass/mass) is preferably 1:5 to 3:2.

The inventive process may preferably comprise a further step h'), which is conducted after step h) and prior to step i). In step h'), the first overhead stream is not directly passed to the distillation column (the 'propylene distillation column') but it is passed to an ethylene distillation column, where it is separated into an ethylene column overhead stream and an ethylene column bottom product stream. The ethylene column overhead stream mainly comprises light components, such as unreacted ethylene and hydrogen, if present. Accordingly, the ethylene column bottom product stream comprises unreacted propylene, a reduced amount of unreacted ethylene and hydrogen, if present, as well as oligomers and cocatalyst.

In this embodiment, the ethylene column bottom product stream is then is passed to the distillation column as a part of the first overhead stream, where the ethylene column bottom product stream is separated into a second overhead stream and a second bottom product stream in subsequent step i).

The second reaction stage may comprise two gas-phase reactors connected in series. In this embodiment, the first product stream is withdrawn from the first reaction stage and passed to the first gas-phase reactor and the polymerization is continued therein as described above. The product stream comprising the reaction mixture from the first gas-phase reactor may either be passed directly or indirectly to the second gas-phase reactor. When passed directly, said product stream is led to the second gas-phase reactor without any purification step. When passed indirectly, said product stream is subjected to a purification step before being led to the second gas-phase reactor. This purification step may include leading said product stream into a gas/solid separation unit, such as a flash tank, where the solid propylene polymer mixture is recovered as the bottom product and passed to the second gas-phase reactor. The off-gas comprising the unreacted propylene and unreacted ethylene may fully or partially freed from hydrogen and/or light inert hydrocarbon impurities by using a membrane unit or a stripping column before being recycled to the first gas-phase reactor or to the second gas-phase reactor. Particularly, the product stream from the first gas phase reactor may be withdrawn and passed to the second gas phase reactor as disclosed in EP 2 330 135 A1. The polymerization is continued in the second gas-phase reactor as described above and the reaction mixture obtained in the second-gas phase reactor may then be subjected to the same recovery process as described above in detail. The first recycle stream may then be passed to the first gas-phase reactor or to the second gas-phase reactor or to both gas-phase reactors.

Polymerization Unit

In another aspect, the present invention refers to polymerization unit, particularly suitable for conducting the inventive process.

In FIG. 1, a polymerization unit according to the present invention for producing a propylene copolymer is shown. The polymerization unit according to the present invention comprises a propylene feed vessel (100) and a pre-polymerization stage (10), a first reaction stage (20) and a second reaction stage (30) connected in series, and a recovery system.

The recovery system comprises;
i) a separation unit (40) connected to the second reaction stage (30);
ii) a first condenser (50) connected to the separation unit (40);
iii) a distillation column (70) connected to the first condenser (50);
iv) a second condenser (80) connected to the distillation column (70); and
v) a stripping column (90);
vi) a distillation reflux line (81) connecting the second condenser (80) with the distillation column (70);
vii) a first recycle line (82) connecting the second condenser (80) with the second reaction stage (30);
viii) a second recycle line (83) connecting the second condenser (80) with the stripping column (90);
ix) a third recycle line (91) connecting the stripping column (90) with the distillation column (70); and
x) a fourth recycle line (92) connecting the stripping column (90) with the propylene feed vessel (100), the pre-polymerization stage (10) and/or with the first reaction stage (20).

As the inventive polymerization unit is particularly suitable for conducting the inventive process, the considerations and limitations as outlined above for the inventive process apply mutatis mutandis to the inventive polymerization unit.

The first reaction stage (20) preferably comprises at least one slurry reactor, further preferably at least one loop reactor. Furthermore, it is preferred that the second reaction stage (30) comprises at least one gas-phase reactor.

Furthermore, it is preferred that the pre-polymerization stage (10) comprises a slurry reactor, further preferably a loop reactor.

Moreover, it is preferred that the separation unit (40) of the recovery system is a tank for solid/gas separation. The separation unit (40) is connected to the second reaction stage (30). In one embodiment, where the second reaction stage (30) comprises one gas phase reactor, the separation unit (40) is connected to the one gas-phase reactor. In another embodiment, the second reaction stage (30) comprises two gas-phase reactors connected in series. In this case, the separation unit (40) may then be connected to the last gas-phase reactor. Alternatively, it may be connected to both gas-phase reactors.

Further, the recovery system comprises a first condenser (50) connected to the separation unit (40). Preferably, the first condenser (50) is connected to the top of the separation unit (40). The first condenser (50) may comprise a cooling vessel, a heat exchanger, a compressor and/or further conventional means for condensing.

The distillation column (70) of the recovery system is connected to the first condenser (50) and represents a 'heavies column' or 'propylene distillation column' as defined above. Preferably, the distillation column (70) is connected to the bottom of the first condenser (50).

The second condenser (80) of the recovery system is connected to the distillation column (70) and may also comprise a cooling vessel, a heat exchanger, a compressor and/or further conventional means for condensing. Preferably, the second condenser (80) is connected to the top of the distillation column (70).

The recovery system further comprises a stripping column (90), a distillation reflux line (81) connecting the second condenser (80) with the distillation column (70); a first recycle line (82) connecting the second condenser (80) with the second reaction stage (30); and a second recycle line (83) connecting the second condenser (80) with the stripping column (90).

Preferably, the recovery system further comprises a control means for controlling the mass flow through the distillation reflux line (81), the first recycle line (82) and/or the second recycle line (83). Such control means typically include a flow meter, such as a mass flow meter, for measuring the mass flow; a controller, which receives a signal from the flow meter and compares the signal to a set point value, and if there is a deviation, sends a signal to a control valve; and a control valve, which receives a signal from the controller and opens or closes based on the signal. The controllers may receive their set points independently, but they may also receive the set points from a higher level controller. Then the set points may be set, for instance, to a specific ratio with respect to each other. As it is well known in the art, such higher level controllers may optimize the process, for instance, for achieving a desired purity of the streams The distillation reflux line (81) connects the second condenser (80) with the distillation column (70). Preferably, the distillation reflux line (81) connects the bottom of the second condenser (80) with the top of the distillation column (70).

The first recycle line (82) connects the second condenser (80) with the second reaction stage (30). In case, the second reaction stage (30) comprises two gas-phase reactors connected in series, the first recycle line (82) connects the second condenser (80) either with the first gas-phase reactor or with the second gas-phase reactor or with both gas-phase reactors. Preferably, the first recycle line (82) connects the bottom of the second condenser (80) with the second reaction stage (30).

In the inventive polymerization unit, the first recycle line (82) fulfils the functionality of a propylene feed vessel for the second reaction stage. In other words, the polymerization unit does not require any propylene feed vessel for the second reaction stage. Therefore, the installation costs as well as the operational costs of the polymerization unit are considerably reduced.

Preferably, the first recycle line (82) comprises a flow control loop and a backflow prevention system. Thereby, the flow through the first recycle line (82) to the second reaction stage (30) may be controlled and backflow from the second reaction stage (30) to the recovery system may be avoided.

The second recycle line (83) connects the second condenser (80) with the stripping column (90). Preferably, the second recycle line (83) connects the bottom of the second condenser (80) with the stripping column (90).

The polymerization unit further comprises a third recycle line (91) connecting (the top of) the stripping column (90), with the distillation column (70); and a fourth recycle line (92) connecting (the bottom of) the stripping column (92) with the propylene feed vessel (100), the pre-polymerization stage (10) and/or with the first reaction stage (20). Preferably, the third recycle line (91) connects the top of the stripping column (90) with the distillation column (70) and the fourth recycle line (92) connects the bottom of the stripping column (90) with the propylene feed vessel (100), the pre-polymerization stage (10) and/or with the first reaction stage (20).

Preferably, as shown in FIG. 2, the recovery system further comprises an ethylene distillation column (60) interposed between the first condenser (50) and the distillation column (70). In this embodiment, the ethylene distillation column (60) is connected to the first condenser (50), preferably to the bottom of the first condenser (50), instead of the distillation column. Accordingly, the distillation column (70) is then connected to the ethylene distillation column (60), preferably to the bottom of the ethylene distillation column (60).

Benefits of the Invention

The present invention is particularly suitable for the production of propylene-ethylene random copolymers having a high ethylene-content in a multistage process. In conventional processes for producing such propylene copolymers, an efficient and cost-effective recovery of unreacted propylene monomer is often hampered due to the presence of too high concentrations of unreacted ethylene comonomer mixed with the propylene. Specifically, an overhead stream from a 'heavies column' or 'propylene distillation column' of a conventional recovery system comprising unreacted propylene, unreacted ethylene and optionally hydrogen is usually condensed and passed as a whole to a stripping column, where light components, such as hydrogen and ethylene, shall be at least partially removed. The remainder, i.e. the bottom product stream comprising unreacted propylene, is then recycled to a propylene feed vessel or to a reaction stage. However, in case of high concentrations of ethylene comonomer, too high load is put on the stripping column, leaving a too high concentration of unreacted ethylene comonomer in the bottom product stream. This may lead to operational troubles such that fresh propylene needs to be fed to the pre-polymerization reactor decreasing the process economy, or additional process steps for the removal of ethylene are required increasing the operational costs.

In the present invention, however, the feed to the stripping column is reduced by splitting the overhead stream from a 'heavies column' or 'propylene distillation column' into three separate streams, wherein only one of the three streams is still passed to the stripping column. Consequently, the separation of ethylene from unreacted propylene in the stripping column is more effective and the ethylene content in the bottom product stream is reduced. When the bottom product stream from the stripping column or at least a part of it is then passed to a propylene feed tank and from there to a pre-polymerisation feed, the polymerisation feed has a reduced content of ethylene compared to a conventional recovery set-up. Then, there is no need for additional process steps for the removal of ethylene, which may be energy-intense and, thus, uneconomical, or feed of unnecessarily high amount of fresh propylene to the reactors. Moreover, as one of the three streams is recycled to the last reaction stage and another one of the three streams is recycled back into the distillation column, no unreacted propylene needs to be sent for disposal. Accordingly, the recovery efficiency of unreacted propylene monomer is improved without affecting the stability of the process. Additionally, it has been found that due to the recycling of one of the three split streams into the last reaction stage, no fresh propylene needs to be introduced thereto for continuing the polymerization. As a result, no additional propylene feed vessel for said reaction stage is required. Consequently, the operational costs of the process and the installation costs of a respective polymerization unit can even be reduced.

LIST OF REFERENCE SIGNS

10 pre-polymerization stage
20 first reaction stage
30 second reaction stage
40 separation unit
50 first condenser
60 ethylene distillation column
70 distillation column
80 second condenser
81 distillation reflux line
82 first recycle line
83 second recycle line
90 stripping column
91 third recycle line
92 fourth recycle line
100 propylene feed vessel

EXAMPLES

In all examples and comparative examples, propylene and ethylene were copolymerized. The catalyst, cocatalyst and external electron donor were first fed into a pre-polymerization reactor, together with propylene from a propylene feed vessel (pre-polymerization stage). The slurry from the pre-polymerization reactor was passed to a loop reactor together with additional propylene from the propylene feed vessel, where a copolymer of propylene with ethylene was produced (first reaction stage). Additionally, ethylene and hydrogen were fed to the loop reactor. The slurry from the loop reactor (first product stream) was passed to a gas phase reactor without separating the fluid components from the polymer, and propylene and ethylene were further copolymerized in the gas phase reactor (second reaction stage). Additional propylene (i.e. recycled propylene), ethylene and hydrogen were fed to the gas phase reactor.

The polymer-gas mixture (second product stream) was withdrawn from the gas phase reactor and the polymer (first bottom product) was separated from the gas. The gas (first overhead stream) was passed to a condenser and from there the condensed gas stream was passed to the top tray of a distillation column ('propylene column') with 11 trays, operated so that the temperature at the top was 48 to 50° C. and at the bottom 50 to 55° C. The pressure was from 17 to 21 bar g. The resulting bottom stream (second bottom product stream) was withdrawn and passed to oligomer disposal. The resulting overhead stream (second overhead stream) was partially condensed in a condenser. The main part of the uncondensed fraction (vapour-phase second overhead stream) was returned to the gas phase reactor while a small part was passed to combustion. The condensed fraction (condensed second overhead stream) was split into three streams: one stream was returned to the top tray of the propylene column (distillation reflux stream), one stream was passed directly to the gas phase reactor (first recycle stream) (only in examples 1-3 but not in the comparative examples) and one stream (second recycle stream) was passed to the bottom tray of a stripper (stripping column). The stripper was a distillation column with 10 trays. It was operated so that the temperature at the top was 57 to 60° C. and at the bottom 59 to 61° C. The pressure was from 17 to 24 bar g.

The overhead stream from the stripper (third overhead stream) was returned to the top of the propylene column and the bottom stream (third bottom product stream) was divided in three streams: the first part was passed to the outlet vessel of the gas phase reactor to enhance degassing of the polymer; the second part was passed to the propylene feed vessel; and the third part was passed to a cracker.

The percentage numbers of the gas composition given in the examples are all % by mole, unless otherwise specified.

Comparative Example 1

The composition of the gas stream recovered from the polymer degassing (first overhead stream) contained 6.6% hydrogen, 1.5% ethylene, 0.2% ethane, 69.2% propylene, 21.6% propane, 0.6% butanes or higher and 0.2% nitrogen. The feed rate of the mixture to the propylene column was 6800 kg/h. The distillate stream (second overhead stream) was partially condensed. The withdrawn vapour stream from the condenser (vapour-phase second overhead stream) was 300 kg/h. From the condensed second overhead stream, 6900 kg/h was returned to the propylene column (distillation reflux stream) and 7500 kg/h was transferred to the stripper (recycle stream).

From the stripper 1100 kg/h was recovered as the overhead stream (third overhead stream) and 6400 kg/h as the bottom stream (third bottom product stream). The bottom stream contained 0.5% ethylene, 73% propylene and 26% propane. A part of the bottom stream was passed to the propylene feed vessel, a part was used in degassing of the polymer downstream of the gas phase reactor and a small part was returned to the cracker.

The total relative hourly cost for operating the recovery system was 100.

Example 1

The process was operated as in Comparative Example 1, except that the stream recovered from the bottom of the condenser (recycle stream with total mass flow rate of 7500 kg/h) was divided in two parts of which 3000 kg/h was sent to the gas phase reactor (first recycle stream) and 4500 kg/h to the stripper (second recycle stream). The process was operated so that the stream recovered as the bottom stream from the stripper (third bottom product stream) had the same composition as in Comparative Example 1. The operation of the gas phase reactor was smooth and the control of the product quality was without a problem.

The total relative hourly cost for operating the recovery system was 83.

Comparative Example 2

The composition of the gas stream recovered from the polymer degassing (first overhead stream) contained 0.3% hydrogen, 2.3% ethylene, 0.1% ethane, 89.2% propylene, 7.7% propane, 0.1% butanes or higher and 0.2% nitrogen. The feed rate of the mixture to the propylene column was 7400 kg/h. The distillate stream (second overhead stream) was partially condensed. The withdrawn vapour stream from the condenser (vapour-phase second overhead stream) was 470 kg/h. From the condensed second overhead stream, 3200 kg/h was returned to the propylene column (distillation reflux stream) and 8500 kg/h was transferred to the stripper (recycle stream).

From the stripper 1100 kg/h was recovered as the overhead stream (third overhead stream) and 7400 kg/h as the bottom stream (third bottom product stream). The bottom stream contained 1% ethylene, 90% propylene and 9% propane. A part of the bottom stream was passed to the propylene feed tank, a part was used in degassing of the polymer downstream of the gas phase reactor and a small part was returned to the cracker.

The total relative hourly cost for operating the recovery system was 100.

Example 2

The process was operated as in Comparative Example 2, except that the stream recovered from the bottom of the condenser (recycle stream with total mass flow rate of 8500 kg/h) was divided in two parts of which 3000 kg/h was sent to the gas phase reactor (first recycle stream) and 5500 kg/h to the stripper (second recycle stream). The process was operated so that the stream recovered as the bottom stream from the stripper (third bottom product stream) had the same composition as in Comparative Example 2. The operation of the gas phase reactor was smooth and the control of the product quality was without a problem.

The total relative hourly cost for operating the recovery system was 80.

Comparative Example 3

The composition of the gas stream recovered from the polymer degassing (first overhead stream) contained 0.4% hydrogen, 2.3% ethylene, 0.1% ethane, 86.8% propylene, 10% propane, 0.1% butanes or higher and 0.2% nitrogen. The feed rate of the mixture to the propylene column was 7900 kg/h. The distillate stream (second overhead stream) was partially condensed. The withdrawn vapour stream from the condenser (vapour-phase second overhead stream) was 340 kg/h. From the condensed second overhead stream, 3300 kg/h was returned to the propylene column (distillation reflux stream) and 9000 kg/h was transferred to the stripper (recycle stream).

From the stripper 1100 kg/h was recovered as the overhead stream (third overhead stream) and 7900 kg/h as the bottom stream (third bottom product stream). The bottom stream contained 1% ethylene, 88% propylene and 11% propane. A part of the bottom stream was passed to the propylene feed tank, a part was used in degassing of the polymer downstream of the gas phase reactor and a small part was returned to the cracker.

The total relative hourly cost for operating the recovery system was 95.

Example 3

The process was operated as in Comparative Example 3, except that the stream recovered from the bottom of the condenser (recycle stream with total mass flow rate of 9000 kg/h) was divided in two parts of which 3000 kg/h was sent to the gas phase reactor (first recycle stream) and 6000 kg/h to the stripper (second recycle stream). The process was operated so that the stream recovered as the bottom stream from the stripper (third bottom product stream) had the same composition as in Comparative Example 3. Also in this case the operation of the gas phase reactor was smooth and the control of the product quality was without a problem.

The total relative hourly cost for operating the recovery system was 78.

The invention claimed is:

1. Process for producing a propylene copolymer in at least three reaction stages connected in series, comprising the steps of:
    a) pre-polymerizing a polymerization catalyst by introducing propylene and the polymerization catalyst into a pre-polymerization stage to produce a pre-polymerized polymerization catalyst;
    b) withdrawing the pre-polymerized polymerization catalyst from the pre-polymerization stage and passing it to a first reaction stage;
    c) polymerizing propylene by introducing propylene and ethylene into the first reaction stage to produce a first reaction mixture comprising a first propylene copolymer, unreacted propylene and unreacted ethylene;
    d) withdrawing a first product stream comprising the first reaction mixture from the first reaction stage and passing at least a part of it to a second reaction stage;
    e) continuing the polymerization in the second reaction stage in the presence of the first propylene copolymer to produce a second reaction mixture comprising a propylene polymer mixture of the first propylene copolymer and a second propylene copolymer, unreacted propylene, and unreacted ethylene;
    f) withdrawing a second product stream comprising the second reaction mixture from the second reaction stage and passing at least a part of it to a separation unit and separating the second product stream into a first overhead stream and a first bottom product stream, the first overhead stream comprising unreacted propylene, unreacted ethylene, as well as oligomers, and the first bottom product comprising solid particles of the propylene polymer mixture;
    g) recovering the propylene polymer mixture from the first bottom product stream;
    h) condensing at least a part of the first overhead stream;
    i) passing at least a part of the first overhead stream to a distillation column and separating the at least a part of the first overhead stream into a second overhead stream and a second bottom product stream, the second overhead stream comprising unreacted propylene, and unreacted ethylene;
    j) withdrawing the second overhead stream and the second bottom product stream from the distillation column; and
    k) condensing at least a part of the second overhead stream, thereby producing a condensed second overhead stream;
    wherein the process further comprises the steps of
    l) splitting the condensed second overhead stream into a distillation reflux stream, a first recycle stream and a second recycle stream, and returning the distillation reflux stream into the top of the distillation column, passing the first recycle stream to the second reaction stage and passing the second recycle stream to a stripping column; and
    m) withdrawing a third overhead stream comprising unreacted ethylene, and a third bottom product stream comprising unreacted propylene from the stripping column, and passing the third overhead stream to the distillation column and passing at least a part of the third bottom stream to a propylene feed vessel, to the pre-polymerisation stage, to the first reaction stage, or to a combination thereof.

2. Process according to claim 1, wherein the first reaction stage comprises at least one slurry reactor and wherein the second reaction stage comprises at least one gas phase reactor.

3. Process according to claim 1, wherein no fresh propylene is introduced into the second reaction stage.

4. The process according to claim 1, wherein hydrogen is introduced in at least one reaction stage.

5. The process according to claim 1, wherein the pre-polymerization stage comprises a slurry reactor.

6. The process according to claim 1, wherein the ratio of the first recycle stream to the second recycle stream (mass/mass) is from 1:5 to 3:2.

7. The process according to claim 1, wherein propylene is fed to the pre-polymerization stage, the first reaction stage and/or to the second reaction stage from a single propylene feed vessel.

8. The process according to claim 1, comprising a further step h') being conducted after step h) and prior to step i), wherein, in step h'), the first overhead stream is passed to an ethylene distillation column, where it is separated into an ethylene column overhead stream and an ethylene column bottom product stream, the ethylene column bottom product stream comprising unreacted propylene, a reduced amount of unreacted ethylene, as well as oligomers, and
    wherein the ethylene column bottom product stream is passed to the distillation column, where the ethylene column bottom product stream is separated into a second overhead stream and a second bottom product stream in subsequent step i).

9. Polymerization unit for producing a propylene copolymer comprising a propylene feed vessel and a pre-polymerization stage, a first reaction stage and a second reaction stage connected in series and a recovery system, the recovery system comprising;

i) a separation unit connected to the second reaction stage;
ii) a first condenser connected to the separation unit;
iii) a distillation column connected to the first condenser;
iv) a second condenser connected to the distillation column; and
v) a stripping column;
wherein the recovery system further comprises
vi) a distillation reflux line connecting the second condenser with the distillation column;
vii) a first recycle line connecting the second condenser with the second reaction stage;
viii) a second recycle line connecting the second condenser with the stripping column;
ix) a third recycle line connecting the stripping column with the distillation column; and
x) a fourth recycle line connecting the stripping column with the propylene feed vessel, the pre-polymerization stage and/or with the first reaction stage.

10. The polymerization unit according to claim 9, wherein the first reaction stage comprises at least one slurry reactor and wherein the second reaction stage comprises at least one gas phase reactor.

11. The polymerization unit according to claim 9, wherein the separation unit is a gas/solid separation unit.

12. The polymerization unit according to claim 9, wherein the pre-polymerization stage comprises a slurry reactor.

13. The polymerization unit according to claim 9, wherein the recovery system further comprises a control means for controlling the mass flow through the distillation reflux line, the first recycle line and/or the second recycle line.

14. The polymerization unit according to claim 9, wherein the first recycle line comprises a flow control loop and a backflow prevention system.

15. The polymerization unit according to claim 9, wherein the recovery system further comprises an ethylene distillation column interposed between the first condenser and the distillation column, wherein the ethylene distillation column is connected to the first condenser and to the distillation column.

16. The process according to claim 1, wherein in step a), ethylene, hydrogen, and/or cocatalyst is further introduced into the pre-polymerization stage.

17. The process according to claim 1, wherein in step c), hydrogen is further introduced into the first reaction stage.

18. The process according to claim 1, wherein in step e), additional propylene, additional ethylene and/or additional hydrogen is further introduced into the second reaction stage.

19. The process according to claim 1, wherein in step k), a vapour-phase second overhead stream is further produced.

20. The process of claim 1, wherein either the pre-polymerization stage or the first reaction stage comprises a loop reactor.

* * * * *